United States Patent Office 3,121,668
Patented Feb. 18, 1964

3,121,668
METHOD FOR THE PRODUCTION OF
1-GLUTAMIC ACID
Phil H. Hidy, Terre Haute, Ind., assignor to Commercial Solvents Corporation, New York, N.Y., a corporation of Maryland
No Drawing. Filed Aug. 26, 1960, Ser. No. 52,047
5 Claims. (Cl. 195—47)

My invention relates to a method of producing 1-glutamic acid and more particularly relates to a method for the production of 1-glutamic acid by the fermentation of nutrient fermentation media with 1-glutamic acid producing strains of *Brevibacterium divaricatum*.

Previously glutamic acid has been successfully prepared by fermentation utilizing the organism *Brevibacterium divaricatum*. However, this organism produces 1-glutamic acid in low yields when a fermentation medium containing only a carbohydrate source, a nitrogen source, a phosphate source, and a potassium source is utilized. Even the addition of trace amounts of mineral salts such as $FeSO_4$ and $MnSO_4$ serve to raise the yields only slightly. Therefore, in order to obtain the product in satisfactory yields it has previously been found necessary to add to the fermentation medium materials such as casate, peptone, corn steep liquor, beet extract, yeast extract, bran extract, etc. By the addition of such materials satisfactory yields of 1-glutamic acid can be obtained. However, these materials are not only expensive but they are not of a definite standardized composition, thus making it difficult to obtain from such a fermentation medium a standardized product in predictable yields.

I have now discovered a process whereby 1-glutamic acid can be produced in a fermentation media consisting of a suitable carbohydrate source, a suitable nitrogen source, a suitable phosphate source and a suitable potassium source without the inclusion of any of the aforementioned expensive and hard to standardize materials.

My new process not only is economical and efficient but allows full utilization of 1-glutamic acid producing strains of the organism *Brevibacterium divaricatum* cultures such as NRRL B–2311 and NRRL B–2312 which have been deposited with the Northern Regional Research Laboratories of the U.S. Department of Agriculture and are described in U.S. Patents 2,978,383 and 2,978,384. My new process therefore represents an improvement over previous methods for the production of 1-glutamic acid by fermentation using the above-mentioned organism by allowing the use of easily obtainable and economical materials in the fermentation medium.

My new process for the production of 1-glutamic acid comprises incubating the organism *Brevibacterium divaricatum* in an aqueous nutrient medium, the said medium containing small amounts of desthiobiotin. The fermentation is preferably carried out at temperatures ranging from about 28 to about 31° C. under submerged conditions of agitation and aeration. Carbohydrates useful in nutrient media for production of 1-glutamic acid by my new process include such materials as glucose and fructose, or crude sugar-containing materials prepared by hydrolyzing such starch-containing materials as sweet potatoes, potatoes, wheat, corn, cassava, and the like. In addition to carbohydrates, nutrient media utilized also require the presence of a nitrogen source in either organic or inorganic form such as urea, ammonium salts such as ammonium chloride, ammonium sulfate, and ammonium tartrate. Also a source of potassium and phosphorous such as dipotassium phosphate is required for suitable yields. Other mineral salts such as magnesium sulfate and ferrous sulfate can also be used with desirable results.

I have found that satisfactory yields of 1-glutamic acid can be obtained using desthiobiotin in amounts of from about 2 to about 25 micrograms per liter of fermentation media. I prefer to use from about 4 to about 10 micrograms of desthiobiotin per liter in the fermentation medium.

In carrying out the process of my invention, I prefer to maintain the fermentation medium at a pH ranging from about 6 to about 9 during the entire fermentation which ordinarily is completed within two to three days time when conducted under aerated conditions.

After preparation of 1-glutamic acid by fermentation of the organism *Brevibacterium divaricatum* according to my above-described process, I can recover the 1-glutamic acid by any suitable means. One such means of recovery involves removing the cells from the fermentation medium by filtration or centrifugation, condensing the resulting filtrate, adjusting the pH of said filtrate to about 3.2 by addition of acid and crystallizing the glutamic acid at reduced temperatures. If a product of a higher grade of purity is desired the condensed filtrate can first be subjected to ion-exchange resin treatment in order to remove other impurities before crystallization. After absorption on the ion-exchange resin the 1-glutamic acid can then be eluted therefrom and again condensed and crystallized at reduced temperature and recovered by centrifugation.

It is understood that the examples given below are for the purpose of illustration only and I do not intend to be limited to specific ingredients or amounts thereof or to the other specific operating conditions other than previously broadly set forth herein.

Example I

*Brevibacterium divaricatum* NRRL B–2312 was cultivated for 20 hours at 30° C. in a seed culture medium of the following composition:

| | Percent |
|---|---|
| Cerelose | 4 |
| Urea | 0.8 |
| $MgSO_4$ | 0.05 |
| $K_2HPO_4$ | 0.10 |

20 ml. of the following medium were then placed in 500 ml. flasks and the contents thereof sterilized for 15 minutes at 115° C.

| | | |
|---|---|---|
| Cerelose | percent | 11 |
| Urea | do | 0.2 |
| $MgSO_4 \cdot 7H_2O$ | do | 0.05 |
| $K_2HPO_4$ | do | 0.1 |
| $FeSO_4$ | p.p.m. | 2 |
| $MnSO_4$ | p.p.m. | 2 |

Each flask was then inoculated with 1.0 ml. seed culture prepared as above described and the flasks then incubated at 30° C. with shaking while maintaining an oxygen absorption co-efficient of $2.5 \times 10^{-6}$ gram mole of oxygen per ml. per minute. At the end of 24 hours, 1% urea was added to the flasks to supply required nitrogen and to maintain the pH neutral or weakly alkaline.

At the end of 48 hours the fermenting medium was found to contain 0.018 gram of 1-glutamic acid per 10 ml.

Example II

The culture of *Brevibacterium divaricatum* NRRL B–2312 was cultivated for 20 hours at 30° C. following the procedure of Example I in a seed culture medium of the following composition:

| | | |
|---|---|---|
| Cerelose | percent | 4 |
| Urea | do | 0.8 |
| $MgSO_4$ | do | 0.05 |
| $K_2HPO_4$ | do | 0.10 |
| Desthiobiotin | micrograms/liter | 2.5 |

20 ml. of the following medium were then placed in 500 ml. flasks and the contents thereof were sterilized for 15 minutes at 115° C.

| | | |
|---|---|---|
| Cerelose | percent | 11 |
| Urea | do | 0.2 |
| $K_2HPO_4$ | do | 0.1 |
| $MgSO_4 \cdot 7H_2O$ | do | 0.05 |
| $FeSO_4$ | p.p.m | 2 |
| $MnSO_4$ | p.p.m | 2 |
| Desthiobiotin | micrograms/liter | 2.5 |

Each flask was then inoculated with 1.0 ml. of seed culture prepared as above described and the flasks were then incubated at 30° C. with shaking while maintaining an oxygen absorption co-efficient of $2.5 \times 10^{-6}$ gram mole of oxygen per ml. per minute. At the end of 24 hours, 1% urea was added to the flasks to supply required nitrogen and to maintain the pH neutral or weakly alkaline.

At the end of 48 hours the fermenting medium was found to contain 0.28 gram of l-glutamic acid per 10 ml. This represents better than a 15-fold improvement in yield in l-glutamic acid over the process of Example I wherein no desthiobiotin was utilized.

*Example III*

The processes of Examples I and II were carried out using *Brevibacterium divaricatum* 2311 instead of *Brevibacterium divaricatum* 2312. Results similar to those of Examples I and II were obtained.

Now having described my invention, what I claim is:

1. In a process for the production of l-glutamic acid by cultivating l-glutamic acid-producing strains of *Brevibacterium divaricatum* in an aqueous nutrient medium containing a carbohydrate source, a phosphate source, a potassium source, and a nitrogen source, the improvement which comprises carrying out the fermentation in the presence of desthiobiotin.

2. The process of claim 1 wherein the amount of desthiobiotin is from about 2 to about 25 micrograms per liter of fermentation medium.

3. The process of claim 1 wherein the strain of the *Brevibacterium divaricatum* was NRRL B–2311.

4. The process of claim 1 wherein the strain of *Brevibacterium divaricatum* was NRRL B–2312.

5. In a process for the production of l-glutamic acid by cultivating l-glutamic acid-producing strains of *Brevibacterium divaricatum* in an aqueous nutrient medium under submerged aerobic conditions until substantial l-glutamic acid content is imparted to said medium, the said medium containing a carbohydrate source, a phosphate source, a potassium source, and a nitrogen source, the fermentation being carried out at a temperature range of from about 28 to about 31° C. and for a period of from about 2 to about 3 days the improvement which comprises carrying out the fermentation in the presence of desthiobiotin.

References Cited in the file of this patent

UNITED STATES PATENTS

| | | |
|---|---|---|
| 2,978,383 | Yamada | Apr. 4, 1961 |
| 2,978,384 | Yamada | Apr. 4, 1961 |
| 3,002,889 | Kinoshita et al. | Oct. 3, 1961 |

FOREIGN PATENTS

| | | |
|---|---|---|
| 562,728 | Canada | Sept. 2, 1958 |

OTHER REFERENCES

"Vitaminology," Eddy, 1949, pages 226 to 241, Williams & Wilkens Co., Baltimore, Md.

The Vitamins, vol. 1, chapter 4 (1954), Academic Press Inc., New York.

Biological Abstracts, vol. 31 (1957), pages 25, 916.

Archives of Biochemistry and Biophysics, vol. 77, 378–386 (1958).